(12) United States Patent
Kamada (10) Patent No.: US 10,106,464 B2
(45) Date of Patent: Oct. 23, 2018

(54) POROUS TITANATE COMPOUND PARTICLES AND METHOD FOR PRODUCING SAME

(71) Applicant: OTSUKA CHEMICAL CO., LTD, Osaka, Osaka (JP)

(72) Inventor: Shogo Kamada, Tokushima (JP)

(73) Assignee: OTSUKA CHEMICAL CO., LTD., Osaka (JP)

(*) Notice: Subject to any disclaimer, the term of this patent is extended or adjusted under 35 U.S.C. 154(b) by 0 days.

(21) Appl. No.: 15/512,691

(22) PCT Filed: Sep. 29, 2015

(86) PCT No.: PCT/JP2015/077514
§ 371 (c)(1),
(2) Date: Mar. 20, 2017

(87) PCT Pub. No.: WO2016/063688
PCT Pub. Date: Apr. 28, 2016

(65) Prior Publication Data
US 2017/0291855 A1    Oct. 12, 2017

(30) Foreign Application Priority Data

Oct. 24, 2014 (JP) ................. 2014-217293

(51) Int. Cl.
*B32B 5/16* (2006.01)
*C04B 35/465* (2006.01)
(Continued)

(52) U.S. Cl.
CPC .......... *C04B 35/465* (2013.01); *C01G 23/005* (2013.01); *C04B 35/62695* (2013.01);
(Continued)

(58) Field of Classification Search
CPC ............... C01G 23/005; C01P 2004/03; C01P 2004/12; C01P 2004/34; C01P 2004/61; Y10T 428/2982
(Continued)

(56) References Cited

U.S. PATENT DOCUMENTS 7,901,659 B2 *   3/2011   Itoi ..................... C01G 23/005
                                                        423/593.1
8,398,952 B2 *   3/2013   Tanimizu ............. C01G 23/005
                                                        423/598
(Continued)

FOREIGN PATENT DOCUMENTS

CN        101597476 A     12/2009
CN        101631747 A     1/2010
(Continued)

OTHER PUBLICATIONS

Perez-Flores, et al., Synthesis, structure and electrochemical Li insertion behaviour of Li2Ti6O13 with the Na2Ti6O13 tunnel-structure, J. of Power Sources 196 (2011) 1378-1385 (Year: 2011).*
(Continued)

*Primary Examiner* — Hoa (Holly) Le
(74) *Attorney, Agent, or Firm* — Westerman, Hattori, Daniels & Adrian, LLP (57) ABSTRACT

Provided axe porous titanate compound particles capable of giving excellent fade resistance when used in a friction material, a resin compound and a friction material each containing the porous titanate compound particles, and a method for producing the porous titanate compound particles. Porous titanate compound particles are each formed of titanate compound crystal grains bonded together and have a cumulative pore volume of 5% or more within a pore diameter range of 0.01 to 1.0 μm.

7 Claims, 4 Drawing Sheets

(51) Int. Cl.
  *C08K 3/22* (2006.01)
  *C04B 35/626* (2006.01)
  *C04B 35/64* (2006.01)
  *C01G 23/00* (2006.01)

(52) U.S. Cl.
  CPC ............ *C04B 35/64* (2013.01); *C08K 3/22* (2013.01); *C01P 2004/03* (2013.01); *C01P 2004/12* (2013.01); *C01P 2004/34* (2013.01); *C01P 2004/61* (2013.01); *C08K 2003/2237* (2013.01)

(58) Field of Classification Search
  USPC .......................................... 428/402; 423/134
  See application file for complete search history.

(56) References Cited

U.S. PATENT DOCUMENTS

| | | | | |
|---|---|---|---|---|
| 8,894,916 | B2* | 11/2014 | Suwabe | C04B 35/478 264/630 |
| 2008/0249222 | A1* | 10/2008 | Itoi | C01G 23/005 524/413 |
| 2010/0112350 | A1* | 5/2010 | Tanimizu | C01G 23/005 428/401 |
| 2010/0119826 | A1 | 5/2010 | Hamauzu et al. | |
| 2011/0158898 | A1 | 6/2011 | Itoi | |
| 2016/0118657 | A1 | 4/2016 | Horie et al. | |

FOREIGN PATENT DOCUMENTS

| | | |
|---|---|---|
| EP | 0834469 B1 | 1/2002 |
| EP | 2138491 BI | 11/2012 |
| JP | H10139894 A | 5/1998 |
| JP | 2008-303121 A | 12/2008 |
| JP | 2009-114050 A | 5/2009 |
| JP | 2012-12261 A | 1/2012 |
| JP | 2012-197187 A | 10/2012 |
| JP | 2013-241312 A | 12/2013 |
| WO | 2008/123046 A1 | 10/2008 |
| WO | 2008/123558 A1 | 10/2008 |
| WO | 2012002122 A1 | 1/2012 |
| WO | 2013/176956 A2 | 11/2013 |
| WO | 2014196462 A1 | 12/2014 |

OTHER PUBLICATIONS

Translation of JP 2012-012261 (2012) (Year: 2012).*
English tranlsaiton of the International Preliminary Report on Patentability dated Apr. 27, 2017, in International Application No. PCT/JP2015/077514.
Office Action dated Sep. 4, 2017, issued in Taiwanese Patent Application No. 104133919.
International Search Report dated Dec. 8, 2015, issued in counterpart International Application No. PCT/JP2015/077514 (2 pages).
Harada et al., Synthesis of Sodium Hexatitanate Powders and Their Properties, Nippon Seramikkusu Kyokai Gakujutsu Ronbunshi 96 [11], 1988, p. 1087-1092 (With English Abstract and figure legends).
Komada et al., An Evaluation Method of Brake Pads for New Titanates, SAE International, 2009.
Office Action dated Apr. 18, 2018, issued in Korean Patent Application No. 10-2017-7010631, with Machine Translation.
Perez Flores et al., "On the Mechanism of Lithium Insertion into $A_2Ti_6O_{13}$(A=Na, Li)", The Electorchemical Society, 2012, vol. 41, pp. 195-206 (English Abstract).

* cited by examiner

POROUS TITANATE COMPOUND PARTICLES AND METHOD FOR PRODUCING SAME

TECHNICAL FIELD

The present invention relates to porous titanate compound particles and a method for producing the same.

BACKGROUND ART

Friction materials for use in brake systems for various vehicles, industrial machines, and so on are required to have high and stable coefficients of friction and thus excellent fade resistance, have excellent wear resistance, and have low aggressiveness against rotors. To meet these characteristics, use was made, as the friction materials, of resin compositions in which asbestos, an inorganic filler, an organic filler, and so on are compounded with a thermosetting resin (binder), such as a phenolic resin, for binding the above additives.

However, because asbestos has been confirmed to be carcinogenic and is easily ground into dust, its use is refrained owing to environmental health problems attributable to its inhalation at work. For this reason, there is proposed as an alternative a friction material in which a fibrous alkaline titanate, such as potassium titanate, is used as a friction modifier. Particularly, potassium titanate fibers are not carcinogenic unlike asbestos, do not damage rotors unlike metal fibers, and have excellent frictional properties, but most of conventional types of potassium titanate fibers have an average fiber diameter of 0.1 to 0.5 µm and an average fiber length of 10 to 20 µm, which are not included within a range of fibers recommended by the World Health Organization (WHO) (range of fibers except for WHO fibers as inhalable fibers, i.e., fibrous compounds having an average minor diameter of 3 µm or less, an average fiber length of 5 µm or more, and an aspect ratio of 3 or more). As a solution to this, potassium titanate having an amoeboid form is proposed in Patent Literature 1.

A fade phenomenon of a friction material is a phenomenon caused because organic components in the friction material are gasified with increasing temperature of the friction material, so that a gas layer is formed at the frictional interface with a disc. The fade resistance of the friction material can foe improved by preventing the formation of the gas layer at the frictional interface. To this end, it is useful to increase the porosity of the friction material to allow easy escape of the gas from the frictional interface. It is conceivable as a method for increasing the porosity of the friction material to adjust and set the forming pressure at a smaller value in the step of binding and forming a source material mixture. However, when the forming pressure is lowered, the strength and wear resistance of the friction material decreases, so that fractional properties cannot be obtained. To cope with this, in Patent Literature 2, hollow powder of an alkaline titanate is proposed which is formed of hollow bodies in each of which alkaline titanate particles having a rodlike, prismoidal, columnar, strip-shaped, granular and/or platy form are bound together.

CITATION LIST

Patent Literature

Patent Literature 1: WO 2008/123046
Patent Literature 2: JP-A-2009-114050

SUMMARY OF INVENTION

Technical Problem

However, potassium titanate used in Patent Literature 1 may contain a trace of WHO fibers. The alkaline titanate used in Patent Literature 2 cannot provide sufficient fade resistance.

An object of the present invention is to provide porous titanate compound particles capable of giving excellent fade resistance when used in a friction material, a resin compound and a friction material each containing the porous titanate compound particles, and a method for producing the porous titanate compound particles.

Solution to Problem

The present invention provides the following porous titanate compound particles, the following resin compound and friction material each containing the porous titanate compound particles, and the following method for producing the porous titanate compound particles.

Aspect 1: Porous titanate compound particles each formed of titanate compound crystal grains bonded together, the porous titanate compound particles having a cumulative pore volume of 5% or more within a pore diameter range of 0.01 to 1.0 µm.

Aspect 2: The porous titanate compound particles according to aspect 1, having an average particle diameter of 5 to 500 µm.

Aspect 3: The porous titanate compound particles according to aspect 1 or 2, wherein the titanate compound is expressed by a composition formula $A_2Ti_nO_{(2n+1)}$ where A represents at least one selected from alkali metals and n=2 to 8.

Aspect 4: A resin composition containing: the porous titanate compound particles according to any one of aspects 1 to 3; and a thermosetting resin.

Aspect 5: A friction material containing the resin composition according to aspect 4.

Aspect 6: A method for producing the porous titanate compound particles according to any one of aspects 1 to 3, the method including the steps of: mechanically grinding a titanium source and an alkali metal salt to prepare a ground mixture; dry-granulating the ground mixture to prepare a granulated material; and firing the granulated material.

Advantageous Effects of Invention

The porous titanate compound particles of the present invention can give excellent fade resistance when used in a friction material.

DESCRIPTION OF EMBODIMENTS

Hereinafter, a description will be given of a preferred embodiment. However, the following embodiment is simply illustrative and the present invention is not limited to the following embodiment.

Porous titanate compound particles of the present invention are porous titanate compound particles each formed of titanate compound crystal grains bonded together by sintering and/or fusion and have a cumulative pore volume of 5% or more within a pore diameter range of 0.01 to 1.0 μm.

In the present invention, the above cumulative pore volume is preferably 10% or more and more preferably 15% or more. The upper limit of the above cumulative pore volume is preferably 40% and more preferably 30%. If the above cumulative pore volume is too small, the porous titanate compound particles may not be able to provide excellent fade resistance when used in a friction material. If the above cumulative pore volume is too large, bonded portions between crystal grains of the titanate compound become weak and may not be able to hold the porous structure. The above cumulative pore volume can be measured by mercury porosimetry.

Furthermore, the BET specific surface area of the porous titanate compound particles of the present invention is preferably within a range of 1 to 13 $m^2/g$ and more preferably within a range of 3 to 9 $m^2/g$. If the above BET specific surface area is too small, the porous titanate compound particles may not be able to provide excellent fade resistance when used in a friction material. If the above BET specific surface area is too large, the chemical reaction in the firing step may not foe completed.

The particle shape of the porous titanate compound particles of the present invention is preferably a powdered shape, such as spherical or irregular, and preferably a non-fibrous shape. Particularly, a spherical shape is preferred.

Although there is no particular limitation as to the particle size of the porous titanate compound particles of the present invention, the average particle diameter is preferably 5 to 500 μm and more preferably 10 to 300 μm. The term average particle diameter used in the present invention means the particle diameter at 50% cumulative volume in a particle size distribution as determined by the laser diffraction and scattering method in which ultrasonic dispersion is not performed. These various types of particle shapes and particle sizes can be arbitrarily controlled depending on production conditions, particularly the composition of source materials, firing conditions, grinding process conditions, and so on.

Examples of the titanate compound that can be cited include those expressed by the composition formulae: $A_2Ti_nO_{(2n+1)}$ where A represents at least one selected from alkali metals and n=2 to 8; $M_xA_yTi_{(2-y)}O_4$ where M represents any alkali metal other than lithium, A represents at least one selected from lithium, magnesium, zinc, nickel, copper, iron, aluminum, gallium, and manganese, x=0.5 to 1.0, and y=0.25 to 1.0; $K_{0.5-0.8}Li_{0.27}Ti_{1.73}O_{3.85-4}$; $K_{0.2-0.8}Mg_{0.4}Ti_{1.6}O_{3.7-4}$; and so on.

Among the above titanate compounds, a titanate compound expressed by the composition formula $A_2Ti_nO_{(2n+1)}$ where A represents at least one selected from alkali metals and n=2 to 8 is preferred and a titanate compound expressed by the composition formula $A_2Ti_6O_{13}$ where A represents at least one selected from alkali metals is more preferred. Examples of the alkali metals include lithium, sodium, potassium, rubidium, cesium, and francium and those preferred among them are lithium, sodium, and potassium because they have an economic advantage over the others. More specifically, $Li_2Ti_6O_{13}$, $K_2Ti_6O_{13}$, $Na_2Ti_6O_{13}$, and so on can be cited as examples.

Although there is no particular limitation as to the method for producing the porous titanate compound particles of the present invention so long as it can provide the properties described previously, an example of the method that can be cited is a method for producing porous titanate compound particles by dry-granulating a ground mixture obtained by mechanically grinding a titanium source and an alkali metal salt and then firing the granulated mixture.

An example of the mechanical grinding that can be cited is the method of grinding the materials while making a physical impact on them. A specific example that can be cited is grinding with a vibration mill. It can be considered that when grinding processing with a vibration mill is performed, shear stress due to frictional grinding of the powder mix concurrently causes a disorder of the atomic arrangement and a decrease in interatomic distance, so that atom transfer occurs at contact points between heterogeneous particles, resulting in the formation of a metastable phase. Thus, a ground mixture having a high reaction activity is obtained, so that the firing temperature to be described hereinafter can be lowered and an unreached product can be reduced even if the ground mixture is granulated. In order to efficiently apply shear stress to the source materials, the mechanical grinding is preferably performed as dry processing in which neither water nor solvent is used.

There is no particular limitation as to the processing time for the mechanical grinding, but it is generally preferably within a range of 0.1 to 2 hours.

The granulation of the ground mixture is performed by dry granulation in which neither water nor solvent is used. The dry granulation can be performed by known methods and examples include tumbling granulation, fluidized bed granulation, and agitation granulation. Wet granulation is not preferred because vaporization of a liquid substance inside a granulated material during the process of drying the granulated material results in the provision of porous particles having large cavities thereinside and the powder strength is thus decreased. In addition, the application of heat to the granulated material is necessary for vaporization or water and solvent, resulting in poor mass productivity.

The temperature for firing the granulated material can be appropriately selected according to the composition of a desired titanate compound, but is preferably within a range of 650 to 1000° C. and more preferably within a range of 800 to 950° C. The firing time is preferably 0.5 to 8 hours and more preferably 2 to 6 hours.

There is no particular limitation as to the titanium source so long as it is a source material containing elemental titanium and not inhibiting the production of an oxide by firing, and examples include compounds that can be converted to titanium oxide by firing in air. Examples of such compounds include titanium oxide, rutile ores, wet cake of titanium hydroxide, and aqueous titania, but the preferred is titanium oxide.

Examples of the alkali metal salt include alkali metal carbonates; alkali metal hydrogen carbonates; alkali metal hydroxides; alkali metal organic acid salts, such as alkali metal acetates; alkali metal sulfates; and alkali metal nitrates, but the preferred are alkali metal carbonates.

The mixture ratio between the titanium source and the alkali metal salt can be appropriately selected according to the composition of the desired titanate compound.

Since the porous titanate compound particles of the present invention have a small pore diameter as described previously, this can reduce impregnation of porous particles with the thermosetting resin. Therefore, when a resin composition containing the porous titanate compound particles of the present invention is used as a friction material, the porous particles serve as escape holes for fading gas. Hence, it can be considered that even if the forming pressure is not adjusted at a smaller value in the step of binding and forming a source material mixture, excellent fade resistance can be obtained. The porous titanate compound particles of the present invention not only improve the fade resistance but also are expected as a friction modifier containing no WHO fiber since they are non-fibrous porous bodies.

A resin composition of the present invention is featured by containing the above-described porous titanate compound particles and a thermosetting resin. The thermosetting resin that can be used is an arbitrary one appropriately selected from among known thermosetting resins. Examples that can be cited include phenolic resins, formaldehyde resins, melamine resins, epoxy resins, acrylic resins, aromatic polyester resins, and urea resins. One of them can be used alone or two or more of them can be used in combination. Preferred among them are phenolic resins.

The porous titanate compound particles of the present invention may be used after being subjected to a surface treatment with a silane coupling agent, a titanate-based coupling agent or the like in the usual manner for the purposes of improving the dispersibility, the adhesiveness to the thermosetting resin, and so on. There is no particular limitation as to the content of the porous titanate compound particles of the present invention in the resin composition, but it is preferably 3 to 30% by mass and more preferably 5 to 25% by mass of the total resin composition.

The resin composition of the present invention can be used for products requiring wear resistance and can be suitably used particularly for friction materials, such as brake pads, brake linings, and clutch facings for various vehicles and industrial machines. Furthermore, the resin composition of the present invention can achieve excellent wear resistance and fade resistance without containing copper, such as copper powder or copper fibers, from the viewpoint of consideration for natural environment.

In using the resin composition of the present invention as a friction material, the resin composition is appropriately blended, depending on required characteristics, together with a known fibrous base material, a friction modifier, and so on, and the mixture is formed into a shape at a predetermined pressure and normal temperature, then thermoformed at a predetermined temperature, and then subjected to thermal treatment and finishing, so that a formed body of a friction material can be produced.

Examples of the fibrous base material include: organic fibers, such as aramid fibers and acrylic fibers; metal fibers, such as steel fibers and copper fibers; inorganic fibers, such as glass fibers, rock wool, ceramic fibers, biodegradable fibers, biosoluble fibers, and wollastonite fibers; and carbon fibers. One of them can be used alone or two or more of them can be used in combination.

Examples of the friction modifier include: organic powders, such as vulcanized or unvulcanized, natural or synthetic rubber, cashew dust, and resin dust; inorganic powders, such as synthetic or natural graphite, carbon black, tin sulfide, molybdenum disulfide, antimony trisulfide, barium sulfate, calcium carbonate, clay, mica, and talc; metal powders, such as copper, aluminum, zinc, and iron; oxide powders, such as alumina, silica, magnesia, zirconia (zirconium oxide), chromium oxide, molybdenum dioxide, zirconium silicate, titanium oxide, and iron oxide; and titanate compound powders which are other than the porous titanate compound particles of the present invention and have a particle shape, such as spherical, laminar, platy, prismoidal, blocky or irregular shape. One of them can be used alone or two or more of them can be used in combination.

EXAMPLES

The present invention will be described below in further detail with reference to specific examples. The present invention is not at all limited by the following examples and modifications and variations may be appropriately made therein without changing the gist of the invention.

<Production of Titanate Compound Particles>

Example 1

Titanium oxide and potassium carbonate weighed to give Ti:K=3:1 (molar ratio) were mixed for 10 minutes while being ground with a vibration mill. The resultant ground mixture was dry-granulated with a high-speed mixer and then fired at 850° C. for four hours in an electric furnace, thus obtaining powder.

The resultant powder was confirmed to be single-phase $K_2Ti_6O_{13}$ using an X-ray diffraction measurement device (Ultima IV manufactured by Rigaku Corporation). The average particle diameter was 169 μm, which was derived from a laser diffraction particle size distribution measurement device (SALD-2100 manufactured by Shimadzu Corporation).

Figure 1:
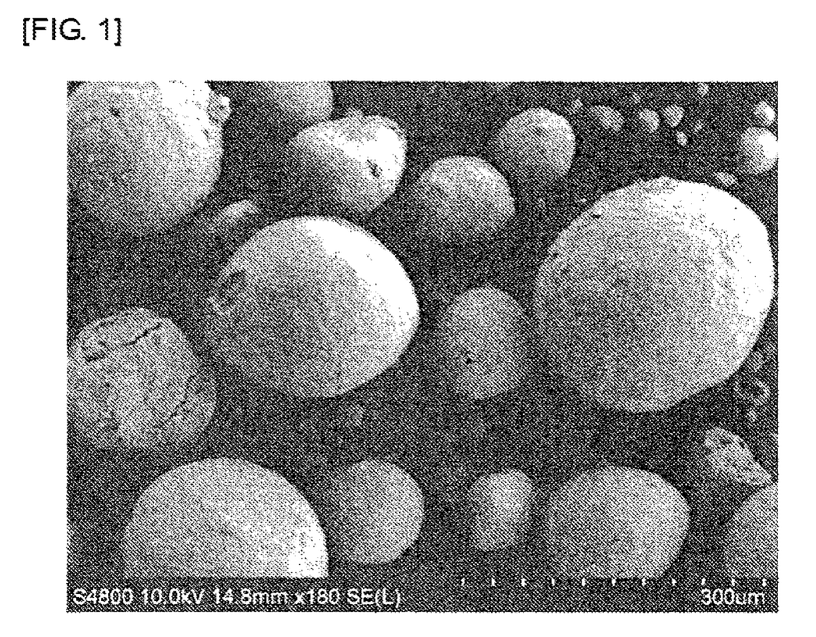
FIG. 1 is a scanning electron micrograph showing complete images of porous titanate compound particles in Example 1.
Figure 2:
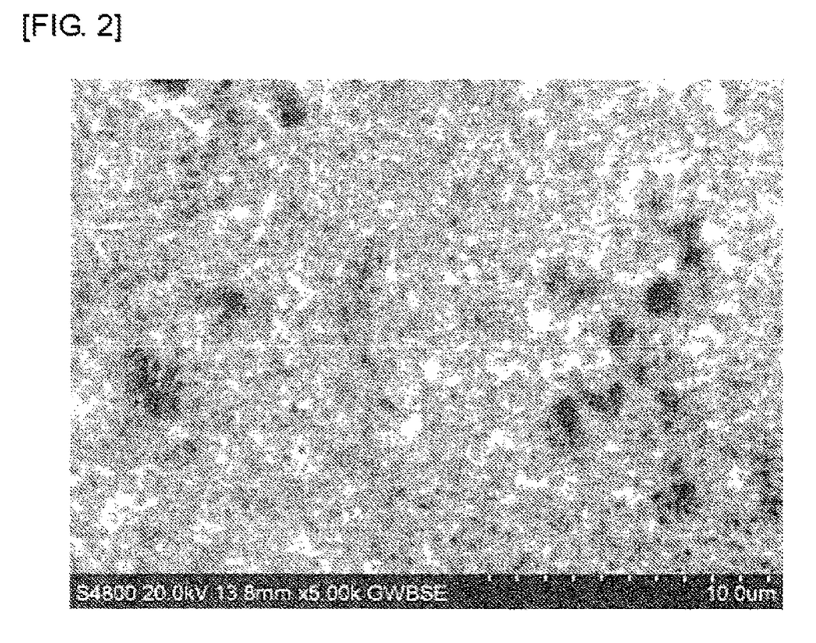
FIG. 2 is a scanning electron micrograph showing an internal structure of a porous titanate compound particle in Example 1.

The shape of the resultant powder was observed using a field-emission scanning electron microscope (SEM) (S-4800 manufactured by Hitachi High-Technologies Corporation). FIG. 1 shows a SEM photograph of complete images of particles and FIG. 2 shows a SEM photograph of the infernal structure of a particle. It can be seen from FIGS. 1 and 2 that the resultant powder is spherical particles having fine voids of less than 1 μm between particulates.

The pores in the resultant powder were measured using a mercury porosimeter (PoreMaster 60-GT manufactured by Quantachrome Instruments). The cumulative pore volume within a pore diameter range of 0.01 to 1.0 μm was 21.1% and the maximum value of the pore size distribution was 0.11 μm.

Furthermore, the resultant powder was measured in terms of BET specific surface area, resulting in a BET specific surface area of 5.9 m²/g.

Example 2

Titanium oxide and sodium carbonate weighed to give Ti:Na=3:1 (molar ratio) were mixed for 10 minutes while being ground with a vibration mill. The resultant ground mixture was dry-granulated with a high-speed mixer and then fired at 850° C. for four hours in an electric furnace, thus obtaining powder.

The evaluation of the resultant powder was made in the same manner as in Example 1. As a result, it was confirmed that the powder was single-phase $Na_2Ti_6O_{13}$ and spherical particles having an average particle diameter of 56 μm, a cumulative pore volume of 24.0% within a pore diameter range of 0.01 to 1.0 μm, and a maximum value of the pore size distribution of 0.34 μm.

Figures 3, 4:
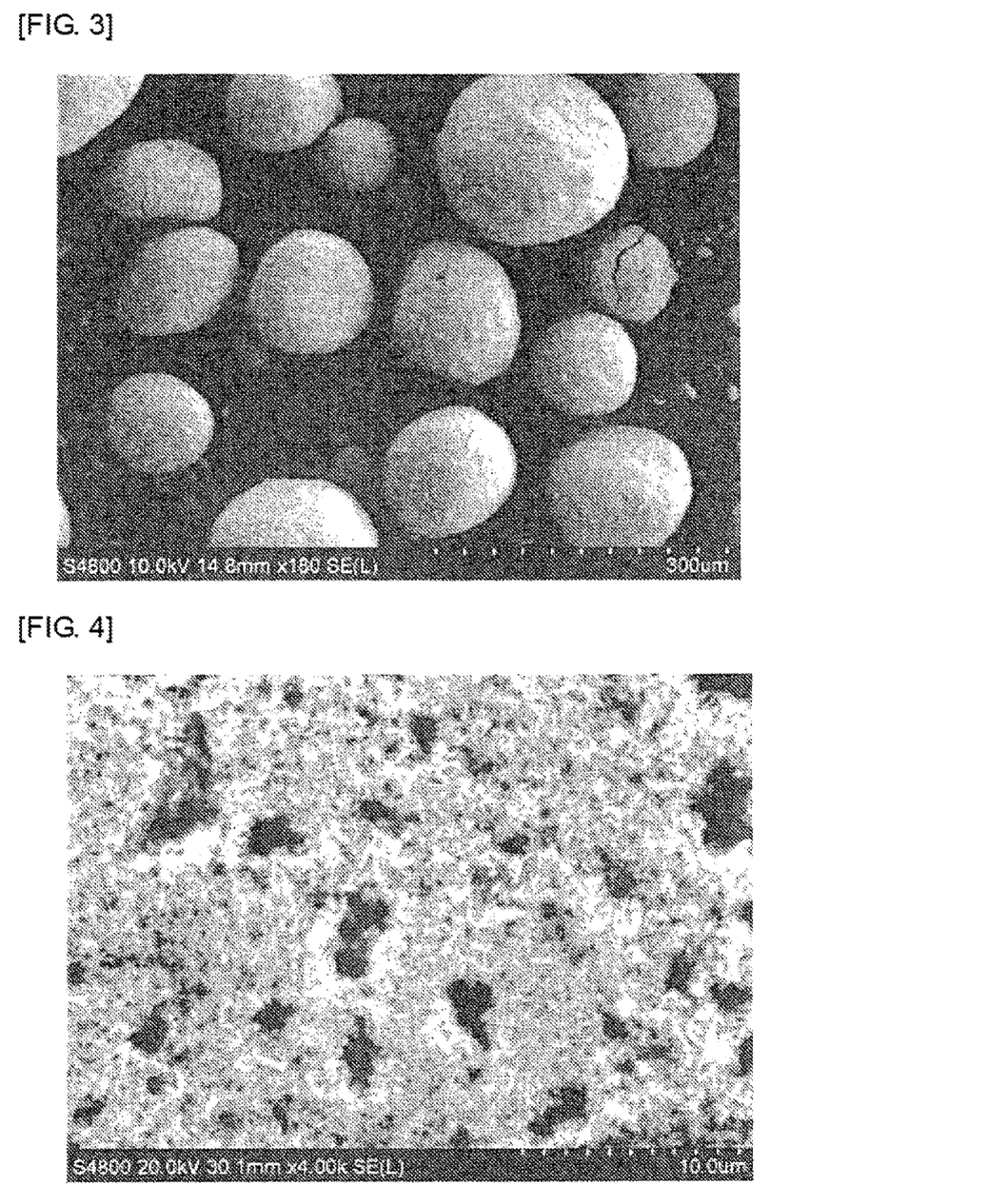
FIG. 3 is a scanning electron micrograph showing complete images of porous titanate compound particles in Example 2.
FIG. 4 is a scanning electron micrograph showing an internal structure of a porous titanate compound, particle in Example 2.

FIG. 3 shows a SEM photograph of complete images of particles and FIG. 4 shows a SEM photograph of the internal structure of a particle.

Furthermore, the resultant powder was measured in terms of BET specific surface area, resulting in a BET specific surface area of 4.4 $m^2/g$.

Example 3

The titanate compound particles obtained in Example 1 were subjected to a surface treatment using a methanol solution of 3-aminopropyltriethoxysilane, thereby obtaining powder. The surface treatment was made so that the amount of 3-aminopropyltriethoxysilane was 0.5% by mass with respect to 1100% by mass titanate compound particles.

Comparative Example 1

Hollow titanate compound particles disclosed in Patent Literature 2 above were produced in the following manner.

Titanium oxide and potassium carbonate weighed to give Ti:K=3:1 (molar ratio) were mixed for 10 minutes while being ground with a vibration mill. The resultant ground mixture was fired at 1050° C. for four hours in an electric furnace and the fired product was ground with a grinding mill, thereby obtaining prismoidal powder having an average breadth of 1.9 μm, an average length of 3.1 μm, and an average aspect ratio of 1.7.

A slurry was prepared using the resultant prismoidal powder, an ethylcellulose-based binder, and a polycarboxylic acid ammonium salt and the resultant slurry was spray-dried. Next, the powder obtained by the spray drying was subjected to a thermal treatment at 900° C. for two hours.

Figure 5:
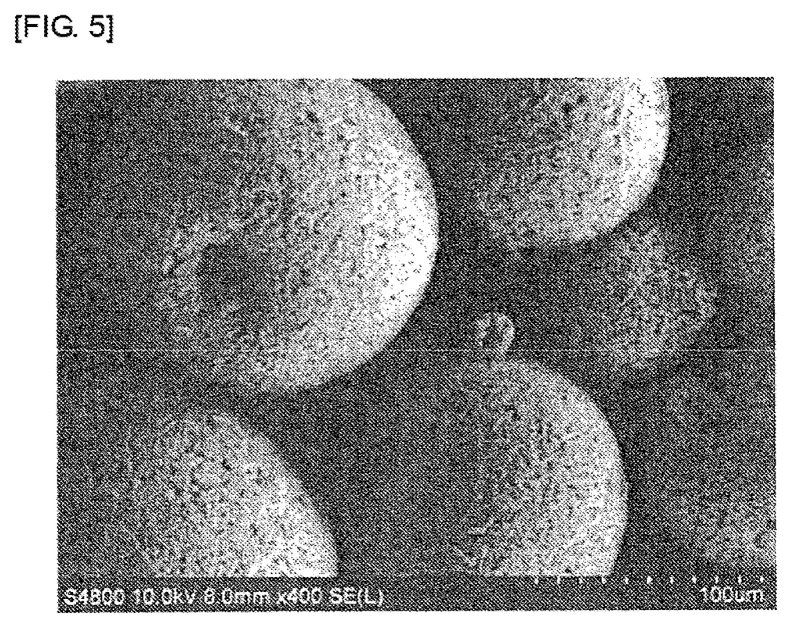
FIG. 5 is a scanning electron micrograph showing complete images of porous titanate compound particles in Comparative Example 1.
Figure 6:
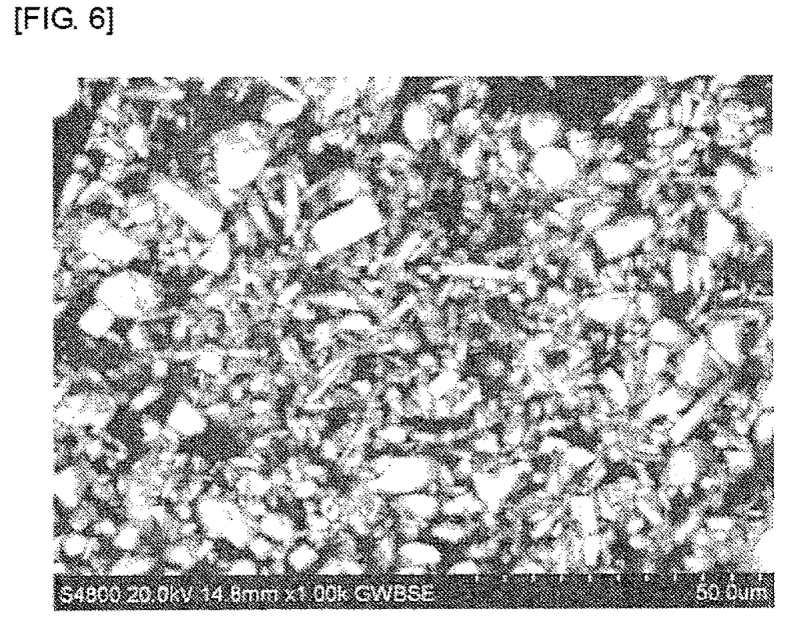
FIG. 6 is a scanning electron micrograph showing an internal structure of a porous titanate compound particle in Comparative Example 1.

The evaluation of the resultant powder was made in the same manner as in Example 1. As a result, it was confirmed that the powder was single-phase $K_2Ti_6O_{13}$ and spherical particles having an average particle diameter of 141 μm, a cumulative pore volume of 2.8% within a pore diameter range of 0.01 to 1.0 μm, and a maximum value of the pore size distribution of 1.9 μm. FIG. 5 shows a SEM photograph of complete images of particles and FIG. 6 shows a SEM photograph of the internal structure of a particle. It can be seen from FIGS. 5 and 6 that the resultant powder is hollow spherical particles having many voids of 1 to 5 μm.

Furthermore, the resultant powder was measured in terms of BET specific surface area, resulting in a BET specific surface area of 0.6 $m^2/g$.

Comparative Example 2

Figure 7:
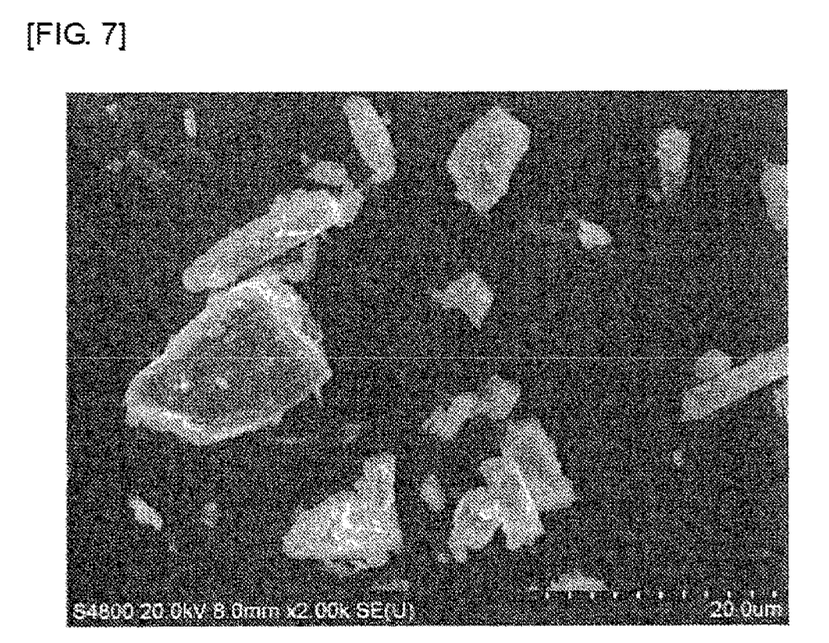
FIG. 7 is a scanning electron micrograph showing porous titanate compound particles in Comparative Example 2.

The powder obtained in Comparative Example 1 was ground in a mortar, thereby obtaining prismoidal powder. FIG. 7 shows a SEM photograph of complete images of particles.

Comparative Example 3

Titanium oxide, potassium carbonate, and lithium carbonate weighed to give Ti:K:Li=1.73:0.8:0.27 (molar ratio) were mixed in the usual manner and the source material mixture was mixed for 30 minutes while being ground with a vibration mill. The resultant ground mixture was fired at 1000° C. for four hours in an electric furnace and the fired product was ground, thereby obtaining powder. The resultant powder was dispersed into water to prepare a 10% by mass slurry. The solid content of this slurry was collected by filtration and dried, thereby obtaining lithium potassium titanate ($K_{0.8}Li_{0.27}Ti_{1.73}O_4$).

The resultant lithium potassium titanate was dispersed into a sulfuric acid solution adjusted at 3.5% by mass, thereby preparing a 5% by mass slurry. The solid content of this slurry was collected by filtration, washed with water, and dried, thereby obtaining titanic acid ($H_2Ti_2O_5$).

The resultant titanic acid was dispersed into a potassium hydroxide solution adjusted at 5.3% by mass, thereby preparing a 10% by mass slurry. The solid content of this slurry was collected by filtration, washed with water, and dried. The resultant product was fired at 500° C. for three hours in an electric furnace, thereby obtaining powder.

The resultant powder was confirmed to be potassium octatitanate ($K_2Ti_8O_{17}$) using an X-ray diffraction measurement device. The average particle diameter was 9 μm, which was derived from a laser diffraction particle size distribution measurement device. The powder shape was confirmed to be platy particles using a SEM.

Comparative Example 4

Titanium oxide, potassium carbonate, and lithium carbonate weighed to give Ti:K:Li=1.73:0.8:0.27 (molar ratio) were mixed in the usual manner and the source material mixture was mixed for 30 minutes while being ground with a vibration mill. The resultant ground mixture was fired at 1000° C. for four hours in an electric furnace and the fired product was ground, thereby obtaining powder. The resultant powder was dispersed into water to prepare a 10% by mass slurry and an acid was added to the slurry. The solid content of this slurry was collected by filtration and dried. After being dried, the product was fired at 600° C. for an hour in an electric furnace, thereby obtaining powder.

The resultant powder was confirmed to be lithium potassium titanate ($K_{0.7}Li_{0.27}Ti_{1.73}O_{3.95}$) having lepidocrocite-type layered crystals using an X-ray diffraction measurement device. The average particle diameter was 15 μm, which was derived from a laser diffraction particle size distribution measurement device. The powder shape was confirmed to be platy particles using a SEM.

Comparative Example 5

Titanium oxide, potassium carbonate, and magnesium hydroxide weighed to give Ti:K:Mg=4:2:1 (molar ratio) were mixed in the usual manner and the source material mixture was mixed for 30 minutes while being ground with a vibration mill. The resultant ground mixture was fired at 1000° C. for four hours in an electric furnace and the fired product was ground, thereby obtaining powder. The resultant powder was dispersed into, water to prepare a 10% by mass slurry and an acid was added to the slurry. The solid content of this slurry was collected by filtration and dried. After being dried, the product was fired at 600° C. for an hour in an electric furnace, thereby obtaining powder.

The resultant powder was confirmed to be magnesium potassium titanate ($K_{0.7}Mg_{0.4}Ti_{1.6}O_{3.95}$) having lepidocrocite-type layered crystals using an X-ray diffraction measurement device. The average particle diameter was 4 μm, which was derived from a laser diffraction particle size distribution measurement device. The powder shape was confirmed to be platy particles using a SEM.

Comparative Example 6

Titanium oxide and potassium carbonate weighed, to give Ti:K=1:1 (molar ratio) were mixed in the usual manner and the source material mixture was mixed for 30 minutes while being ground with a vibration mill. The resultant ground mixture was fired at 780° C. for four hours in an electric furnace and the fired product was ground, thereby obtaining potassium dititanate ($K_2Ti_2O_5$).

The resultant potassium dititanate was dispersed into water to prepare a 15% by mass slurry and an acid was added to the slurry. The solid content of this slurry was collected by filtration and dried. After being dried, the product was fired at 600° C. for an hour in an electric furnace and the fired product was pulverized with a hammer mill, thereby obtaining powder.

The resultant powder was confirmed to be potassium 7.9-titanate ($K_2Ti_{7.9}O_{16.8}$) using an X-ray diffraction measurement device. The average particle diameter was 11 μm, which was derived from a laser diffraction particle size distribution measurement device. The powder shape was confirmed, using a SEM, to be particles having an irregular shape (amoeboid shape) in which a plurality of projections extend in irregular directions.

<Production of Friction Material>

Example 3

Source materials were blended at each compounding ratio according to Table 1 and mixed with a Lodige mixer and the obtained mixture was preliminarily formed (at 25 MPa), thermoformed (at 150° C. and 20 MPa), and further subjected to a thermal treatment at 220° C. to produce a disc brake pad.

<Evaluation of Friction Material>

A friction test was done using a general-purpose, full-sized dynamometer tester in conformity with JASO C-406. The porosity of the friction material was measured by oil immersion in conformity with JIS D4418. The results are shown in Table 1.

TABLE 1

|  |  | Ex. 3 | Ex. 4 | Ex. 5 | Ex. 6 | Ex. 7 | Ex. 8 | Ex. 9 | Ex. 10 | Ex. 11 | Comp. Ex. 7 |
|---|---|---|---|---|---|---|---|---|---|---|---|
| Blend (% by mass) | Ex. 1 (porous $K_2Ti_6O_{13}$) | 15 |  | 20 |  |  | 10 | 10 | 10 | 10 |  |
|  | Ex. 2 (porous $Na_2Ti_6O_{13}$) |  | 15 |  | 20 |  |  |  |  |  |  |
|  | Ex. 3 (porous $K_2Ti_6O_{13}$, surface treatment) |  |  |  |  | 20 |  |  |  |  |  |
|  | Comp. Ex. 1 (hollow $K_2Ti_6O_{13}$) |  |  |  |  |  |  |  |  |  | 15 |
|  | Comp. Ex. 2 (prismoidal $K_2Ti_6O_{13}$) |  |  |  |  |  |  |  |  |  |  |
|  | Comp. Ex. 3 (platy $K_2Ti_8O_{17}$) |  |  |  |  |  | 10 |  |  |  |  |
|  | Comp. Ex. 4 (platy $K_{0.7}Li_{0.27}Ti_{1.73}O_{3.95}$) |  |  |  |  |  |  | 10 |  |  |  |
|  | Comp. Ex. 5 (platy $K_{0.7}Mg_{0.4}Ti_{1.6}O_{3.95}$) |  |  |  |  |  |  |  | 10 |  |  |
|  | Comp. Ex. 6 (amoeboid $K_2Ti_{7.9}O_{16.8}$) |  |  |  |  |  |  |  |  | 10 |  |
|  | Phenolic resin | 8 | 8 | 10 | 10 | 10 | 10 | 10 | 10 | 10 | 8 |
|  | Barium Sulfate | 30 | 30 | 20 | 20 | 20 | 20 | 20 | 20 | 20 | 30 |
|  | Mica | 20 | 20 | 15 | 15 | 15 | 15 | 15 | 15 | 15 | 20 |
|  | Cashew dust | 5 | 5 | 10 | 10 | 10 | 10 | 10 | 10 | 10 | 5 |
|  | Zirconium silicate | 5 | 5 |  |  |  |  |  |  |  | 5 |
|  | Zirconium oxide |  |  | 5 | 5 | 5 | 5 | 5 | 5 | 5 |  |
|  | Iron oxide |  |  | 10 | 10 | 10 | 10 | 10 | 10 | 10 |  |
|  | Tin sulfide |  |  | 5 | 5 | 5 | 5 | 5 | 5 | 5 |  |
|  | Tire powder | 5 | 5 |  |  |  |  |  |  |  | 5 |
|  | Synthetic graphite | 5 | 5 | 2 | 2 | 2 | 2 | 2 | 2 | 2 | 5 |
|  | Aramid pulp | 1 | 1 | 2 | 2 | 2 | 2 | 2 | 2 | 2 | 1 |
|  | Lime hydrate | 1 | 1 | 1 | 1 | 1 | 1 | 1 | 1 | 1 | 1 |
|  | Copper powder | 5 | 5 |  |  |  |  |  |  |  | 5 |
| Properties | Friction test (first fade test: minimum μ per 10 bracking actions) | 0.28 | 0.27 | 0.31 | 0.33 | 0.30 | 0.30 | 0.30 | 0.30 | 0.31 | 0.14 |
|  | Porosity (%) | 13.9 | 14.0 | 23.5 | 24.1 | 26.1 | 22.0 | 21.0 | 20.0 | 22.0 | 13.7 |

|  |  | Comp. Ex. 8 | Comp. Ex. 9 | Comp. Ex. 10 | Comp. Ex. 11 | Comp. Ex. 12 | Comp. Ex. 13 | Comp. Ex. 14 |
|---|---|---|---|---|---|---|---|---|
| Blend (% by mass) | Ex. 1 (porous $K_2Ti_6O_{13}$) |  |  |  |  |  |  |  |
|  | Ex. 2 (porous $Na_2Ti_6O_{13}$) |  |  |  |  |  |  |  |
|  | Ex. 3 (porous $K_2Ti_6O_{13}$, surface treatment) |  |  |  |  |  |  |  |
|  | Comp. Ex. 1 (hollow $K_2Ti_6O_{13}$) |  |  | 20 |  |  |  |  |
|  | Comp. Ex. 2 (prismoidal $K_2Ti_6O_{13}$) | 15 |  |  | 20 |  |  |  |
|  | Comp. Ex. 3 (platy $K_2Ti_8O_{17}$) |  |  |  |  | 20 |  |  |
|  | Comp. Ex. 4 (platy $K_{0.7}Li_{0.27}Ti_{1.73}O_{3.95}$) |  |  |  |  |  | 20 |  |
|  | Comp. Ex. 5 (platy $K_{0.7}Mg_{0.4}Ti_{1.6}O_{3.95}$) |  |  |  |  |  |  | 20 |
|  | Comp. Ex. 6 (amoeboid $K_2Ti_{7.9}O_{16.8}$) |  |  |  |  |  |  | 20 |
|  | Phenolic resin |  | 5 | 30 | 10 | 10 | 10 | 10 | 10 |
|  | Barium Sulfate | 30 | 20 | 20 | 20 | 20 | 20 | 20 |
|  | Mica | 20 | 15 | 15 | 15 | 15 | 15 | 15 |
|  | Cashew dust | 5 | 10 | 10 | 10 | 10 | 10 | 10 |
|  | Zirconium silicate | 5 |  |  |  |  |  |  |
|  | Zirconium oxide |  | 5 | 5 | 5 | 5 | 5 | 5 |
|  | Iron oxide |  | 10 | 10 | 10 | 10 | 10 | 10 |
|  | Tin sulfide |  | 5 | 5 | 5 | 5 | 5 | 5 |
|  | Tire powder | 5 |  |  |  |  |  |  |
|  | Synthetic graphite | 5 | 2 | 2 | 2 | 2 | 2 | 2 |

TABLE 1-continued

|  |  | | | | | | | |
|---|---|---|---|---|---|---|---|---|
|  | Aramid pulp | 1 | 2 | 2 | 2 | 2 | 2 | 2 |
|  | Lime hydrate | 1 | 1 | 1 | 1 | 1 | 1 | 1 |
|  | Copper powder | 5 | | | | | | |
| Properties | Friction test (first fade test: minimum μ per 10 bracking actions) | 0.12 | 0.15 | 0.11 | 0.21 | 0.22 | 0.22 | 0.23 |
|  | Porosity (%) | 10.2 | 23.1 | 18.0 | 21.0 | 19.4 | 19.0 | 20.0 |

It can be seen that, as shown in Table 1, in each of Examples 3 to 11 in which the porous titanate compound particles in Examples 1 to 3 according to the present invention are used, the minimum coefficient of friction (μ) per 10 braking actions, which is one of fade test items, is higher than in Comparative Examples 7 to 14 in which the titanate compound particles in Comparative Examples 1 to 6 are used and, therefore, Examples 3 to 11 exhibit excellent fade resistance regardless of whether or not they contain copper powder.

The invention claimed is:

1. Porous titanate compound particles each formed so that crystal grains of a titillate compound expressed by a composition formula $A_2Ti_6O_{13}$ where A represents at least one selected from alkali metals are bonded together, the porous titanate compound particles having a cumulative pore volume of 5% or more within a pore diameter range of 0.01 to 1.0 μm.

2. The porous titanate compound particles according to claim 1, having an average particle diameter of 5 to 500 μm.

3. A resin composition containing: the porous titanate compound particles according to claim 1; and a thermosetting resin.

4. A friction material containing the resin composition according to claim 3.

5. A method for producing porous titanate compound particles each formed of titanate compound crystal grains bonded together, the porous titanate compound particles having a cumulative pore volume of 5% or more within a pore diameter range of 0.01 to 1.0 the method comprising the steps of:
mechanically grinding a titanium source, and an alkali metal salt to prepare a ground mixture;
dry-granulating the ground mixture to prepare a granulated material; and
firing the granulated material.

6. The method for producing porous titanate compound particles according to claim 5, Wherein the porous titanate compound particles have an average particle diameter of 5 to 500 μm.

7. The method for producing porous titanate compound particles according to claim 5, wherein the titanate compound is expressed by a composition formula $A_2Ti_nO_{(2n+1)}$ where A represents at least one selected from alkali metals and n=2 to 8.

* * * * *